No. 866,717.  
PATENTED SEPT. 24, 1907.  
G. W. CRANE.  
DUMPING WAGON.  
APPLICATION FILED MAY 9, 1907.

4 SHEETS—SHEET 1.

Witnesses  
Frank A. Fahle  
Thomas H. McMeans

Inventor  
George W. Crane  
By Bradford Hood  
Attorneys

THE NORRIS PETERS CO., WASHINGTON, D. C.

No. 866,717. PATENTED SEPT. 24, 1907.
G. W. CRANE.
DUMPING WAGON.
APPLICATION FILED MAY 9, 1907.

4 SHEETS—SHEET 2.

Witnesses
Frank A. Fahl
Thomas W. McMeans

Inventor
George W. Crane
By Bradford Hood
Attorneys

No. 866,717. PATENTED SEPT. 24, 1907.
G. W. CRANE.
DUMPING WAGON.
APPLICATION FILED MAY 9, 1907.
4 SHEETS—SHEET 3.
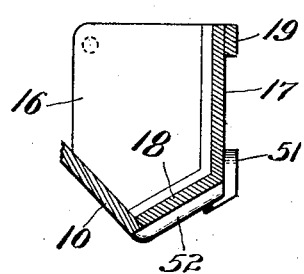
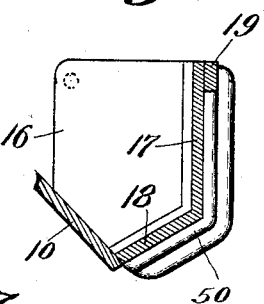
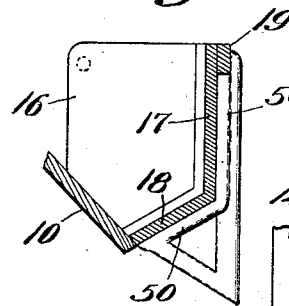
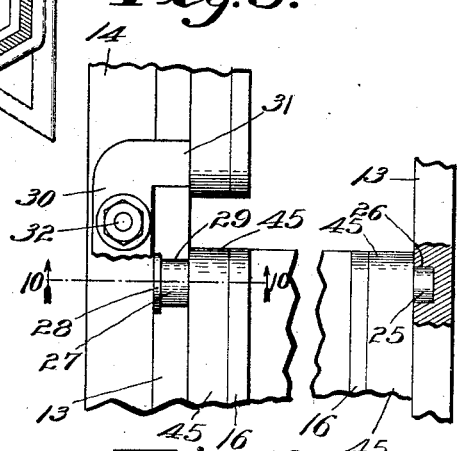
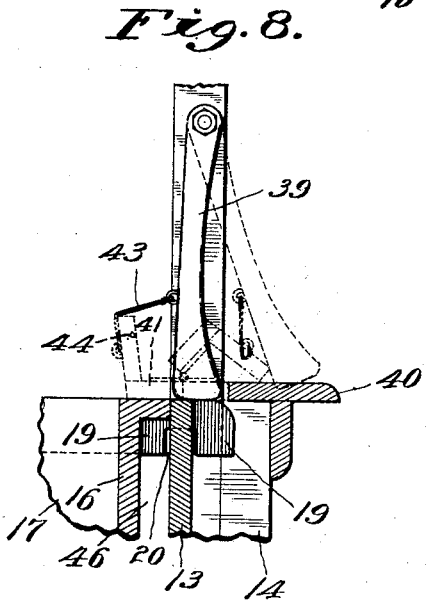
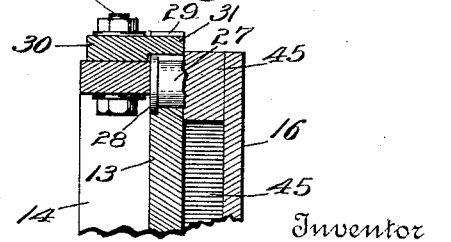
Witnesses
Frank A. Fahle
Thomas W. McMeans
Inventor
George W. Crane
BY Bradford Hood
Attorneys
THE NORRIS PETERS CO., WASHINGTON, D. C.

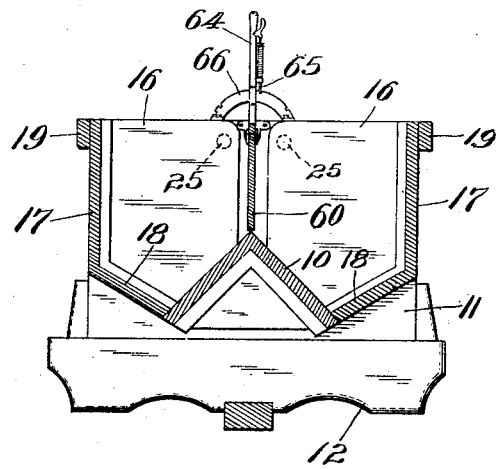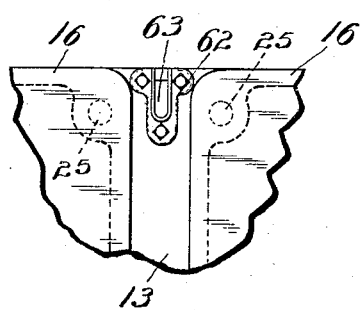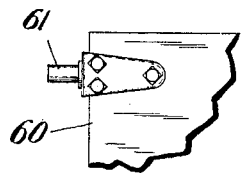

UNITED STATES PATENT OFFICE.

GEORGE W. CRANE, OF VEEDERSBURG, INDIANA.

DUMPING-WAGON.

No. 866,717.      Specification of Letters Patent.      Patented Sept. 24, 1907.

Application filed May 9, 1907. Serial No. 372,789.

*To all whom it may concern:*

Be it known that I, GEORGE W. CRANE, a citizen of the United States, residing at Veedersburg, in the county of Fountain and State of Indiana, have invented certain new and useful Improvements in Dumping-Wagons, of which the following is a specification.

The object of my invention is to produce a dumping wagon of such construction that while the body will be a tight body, yet the entire contents may be readily and quickly discharged.

Figure 1:
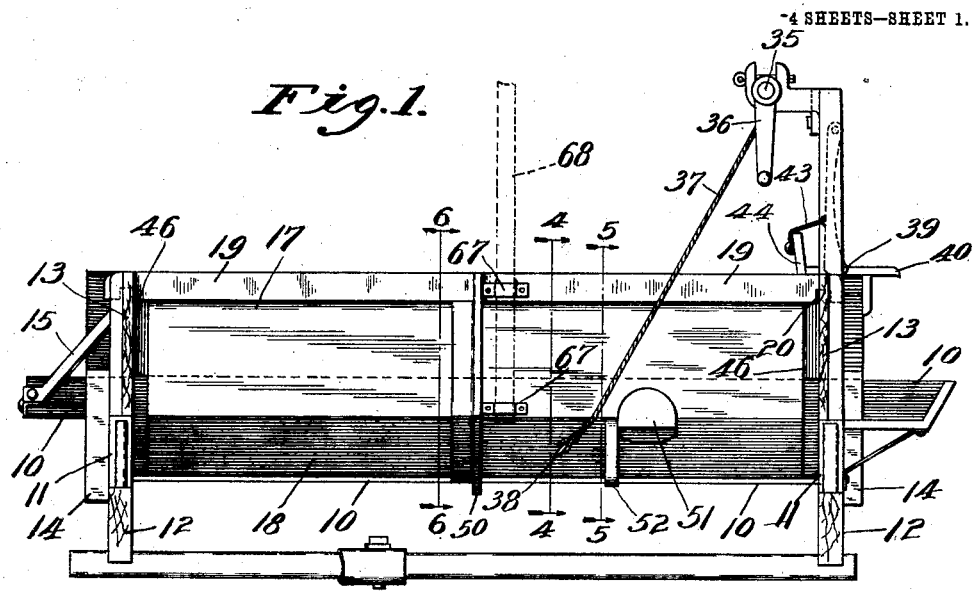
Figure 2:
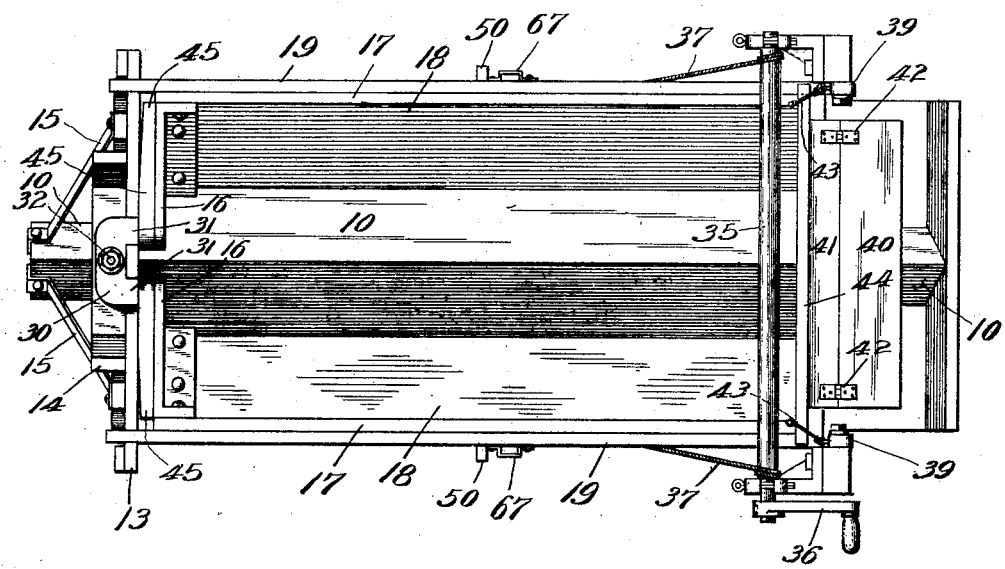
Figure 3:
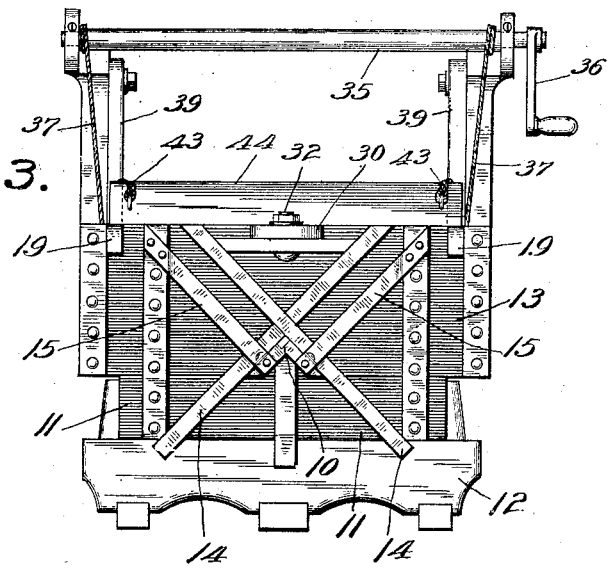
Figure 4:
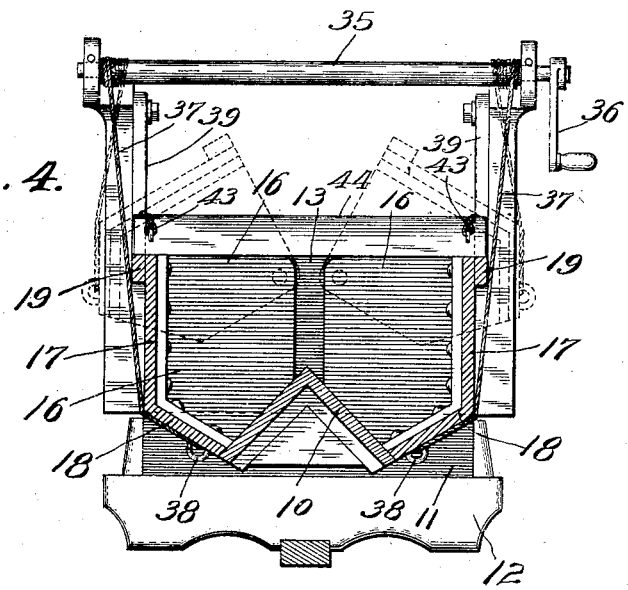

The accompanying drawings illustrate my invention:

Figure 1 is a side elevation of a wagon bed embodying my invention, the running gear being omitted; Fig. 2 is a plan; Fig. 3 a rear end elevation; Fig. 4 a transverse section on line 4—4 of Fig. 1; Fig. 5 a section on line 5—5 of Fig. 1 showing the means for preventing displacement by underrunning of the front wheels; Fig. 6 a section on line 6—6 of Fig. 1 showing a means for bracing one of the swinging sides; Fig. 7 a similar detail showing a modified form of brace; Fig. 8 a detail on a larger scale of the means for automatically locking and unlocking the swinging sides; Fig. 9 a detail of the pivotal support for the swinging sides; Fig. 10 a vertical sectional detail on line 10—10 of Fig. 9; Fig. 11 a transverse section showing a means for separating the load into halves and for removing any material which may gather on the crown of the intermediate or central ridge; Fig. 12 a detail of one of the supporting brackets for the divider board, and Fig. 13 a detail of the divider board and its supporting pintle.

In the drawings 10 indicates a central inverted V-shaped ridge structure supported at each end by a cross-bar 11 which is adapted to rest upon the ordinary bolster 12 of a standard running gear (not shown). Attached to the upper edge of cross-bar 11 are the end boards 13, said boards being securely braced in position by an X-brace 14, the members of which are secured to the outer face of the end board and the cross bar 11, and the lower ends extended below the lower edge of the bar 11 so as to engage or lap over the adjacent face of the bolster 12 and thus hold the body securely in place on the bolsters 12. In order to further brace the end boards 13 I provide the braces 15, arranged as shown, the lower ends being attached to so much of the central ridge 10 as is projected through and beyond the end board.

Acting in conjunction with the central ridge 10 and the end boards 13 are two similar swinging members each of which comprises a pair of end plates 16 a connecting vertical wall 17, and a downwardly and inwardly inclined bottom 18 connected at its outer edge with the lower edge of side 17 and adapted at its inner edge to mate with the lower edge of the adjacent portion of the intermediate ridge 10. The upper edge of each side 17 is strengthened with a longitudinal bar 19, the ends of which project beyond the end plates 16 and are notched at 20 to receive the upper edge of the adjacent end board 13 (as shown in Fig. 8) which is similarly notched to receive the projected end of the bar 19, the bar 19 when in this position, serving as a brace and support for the upper edge of the adjacent end board. Each of the swinging sides just described is pivotally supported, upon an axis parallel with the central ridge 10, at its upper inner corner, and for convenience of construction I provide the forward plate 16 with a pivot pin 25 adapted to enter a socket 26 formed in the forward end board 13, while the rear plate 16 is provided with a pin 27 having an enlarged head 28. In order to receive the pin 27—28, the upper edge of the adjacent rear end board 13 is provided with an open notch 29 fitted to receive the pin 27—28 so that the enlargement 28 thereof will co-act with the end board so as to form a brace therefor, as clearly shown in Fig. 10. In order to hold the pins 27—28 in place I provide a plate 30 having a pair of fingers 31 adapted to lie in the upper ends of the notches 29 above the pins 27—28, said plate being held in position by a single bolt 32, the arrangement being such that, by removing plate 30, and swinging pin 27—28 upward out of its notch, the entire swinging member of the bed may be shifted longitudinally enough to withdraw pin 25 from its socket 26, whereupon the entire member may be readily withdrawn from the bed.

In order to swing the swinging members of the bed upward readily I provide, near the front end of the wagon, a shaft 35 provided with a suitable operating crank 36. Attached to shaft 35 are lifting cables 37 which are attached to the swinging members at points 38 near their lower edges.

In order to securely hold the swinging members of the bed down in load holding position, I provide a pair of pivoted locking fingers 39, 39 each of which, in its normal position depends from its pivot to a point immediately above the projected end of one of the bars 19, as clearly shown in full lines in Fig. 8. In order to provide means for readily simultaneously operating these two locking fingers, I make the seat in two parts, a front fixed portion 40 and a swinging rear portion 41, attached to the rear edge of portion 40 by suitable hinges 42. Each of the locking fingers 39 is connected by a rope or chain 43 with the swinging member 41 of the seat, the arrangement being such that, when the seat is in normal position, as shown in full lines in Figs. 1 and 2, the ropes 43 will serve to positively draw the locking fingers 39 to locking position. The seat member 41 is provided with an upwardly projected portion 44 which, when the seat member is swung forward, will engage the locking fingers so as to swing them to the position indicated in dotted lines in Fig. 8, thus freeing the bars 19.

The pivot pins for the swinging members of the bed are preferably carried by brackets 45 secured to the end plates 16 and these brackets are preferably secured to the outer faces of these end plates so as to leave a space 46 between the outer faces of these end plates and the inner faces of the end boards 13 so that any accidental lodgment of material adjacent the end boards will not operate to bind the swinging members between them. In order to prevent leakage at the ends of the swinging members the brackets 45 are continued down along the inner edge of the plate 16 so as to form a tight joint with the end board 13, as clearly shown in Fig. 10. The relative sizes of some of the parts are exaggerated in the drawings for convenience in illustrating.

In order to properly brace the inclined bottom members 18 I deem it advisable to provide one or more intermediate braces 50 which, if desired, may assume the form shown in Fig. 7.

In order to prevent the forward wheels from distorting the bed when a sharp turn is made, I provide each of the swinging members with a wheel plate 51 and immediately adjacent said plate I secure to the inclined bottom 18, a finger or bar 52, the lower inner end of which is projected beneath the lower edge of the adjacent portion of the ridge 10, as clearly shown in Fig. 5, the construction being such that, if the wheel is driven under the bottom 18 against the plate 51, finger 52 will transmit the thrust to the middle ridge 10 and thus prevent any distortion of the bottom 18.

It is desirable many times to dump one side of a load at a time, and for this purpose I provide a divider board 60 provided at each end with a pintle 61 adapted to be dropped into a bracket 62 having a receiving socket 63 open at its upper end, the arrangement being such that the pintle 61 may be readily dropped into or removed from the socket 63. In order to swing the board 60 readily, and thus clear any material which may have lodged upon the top of the ridge 10, I provide an operating lever 64 and, in order to hold the board 60 in its middle position, said lever 64 may be provided with a suitable detent 65 coöperating with a segment 66.

In order to swing the two sections independently the cables 37 are preferably detachably connected to the shaft 35 and, for convenience, I deem it advisable to provide each of the swinging members with a pair of lever-receiving clips 67 adapted to receive an operating lever 68, shown in dotted lines in Fig. 1.

The pivotal axis of each of the swinging members of the bed is arranged as nearly as possible to the medial line of the vehicle and as nearly as possible at the upper inner corner of the swinging section so that, when said section is swung upon its axis all parts thereof will initially move away from the load so that no cramping on or compression of the load results from the swinging of the sections to dumping position.

The pivotal axis of the swinging side section lies in a plane nearer the center of the bed than the inner edge of the bottom 18 and consequently whatever portion of the load acts upon the swinging section has a tendency to swing the section farther inward upon its axis so that the load operates to hold the section in load retaining position. Further than this, the sides 17, being substantially vertical for a considerable portion of the depth of the section, the side thrust, due to fluidity of the load, would be more than counterbalanced by the weight component acting upon the bottom 18.

1. In a dumping wagon, the combination, with the ends of the box thereof, of a pair of longitudinal swinging side sections pivotally supported at their upper inner corners, and means for locking said sections in load retaining position.

2. In a dumping wagon, the combination, with the ends of the box thereof, of a pair of longitudinal swinging side sections pivotally supported at their upper inner corners, means for locking said sections in load retaining position, a rotary shaft, and connections between said shaft and the two sections whereby they may be simultaneously operated.

3. In a dumping wagon, the combination, with the ends of the box thereof, of a pair of longitudinal swinging side sections pivotally supported at their upper inner corners, means for locking said sections in load retaining position, a swinging seat, and intermediate connections between the locking means and the seat for automatically operating the locking means.

4. In a dumping wagon, the combination, with the ends of the box thereof, of a pair of longitudinal swinging side sections pivotally supported at their upper inner corners, means for locking said sections in load retaining position, a rotary shaft, connections between said shaft and the two sections whereby they may be simultaneously operated, a swinging seat, and intermediate connections between the locking means and the seat for automatically operating the locking means.

5. In a dumping wagon, the combination with the ends of the box thereof, of a pair of longitudinal swinging side sections pivotally supported at their upper inner corners, and a depending locking pawl arranged in position to engage and retain said swinging member in load retaining position.

6. In a dumping wagon, the combination with the ends of the box thereof, of a pair of longitudinal swinging side sections pivotally supported at their upper inner corners, a depending locking pawl arranged in position to engage and retain said swinging member in load retaining position, a swinging seat member, and connections between said seat member and said depending pawls whereby said pawls may be simultaneously operated by the swinging seat member.

7. In a dumping wagon, the combination, with a pair of cross-bars adapted to rest upon the bolsters of a running gear, of end boards carried by said cross-bars, means carried by said cross-bars for engaging the running gear bolsters to prevent displacement, an intermediate medial ridge connecting the cross-bars, a pair of sections extending between the end boards and each coacting with the adjacent edge of the medial ridge, and a horizontal pivotal connection between each swinging section and the end boards at the upper inner corner of the section.

8. In a dumping wagon, the combination, with a pair of cross bars adapted to rest upon the bolsters of a running gear, of end boards carried by said cross-bars, means carried by said cross-bars for engaging the running gear bolsters to prevent displacement, an intermediate medial ridge connecting the cross-bars, a pair of sections extending between the end boards and each coacting with the adjacent edge of the medial ridge, a horizontal pivotal connection between each swinging section and the end boards at the upper inner corner of the section, said pivotal connection comprising a pin and socket connection at one end and a pin and open-ended slot connection at the other end, and a removable retaining plate for said last mentioned connection.

9. In a dumping wagon, the combination, with a pair of cross-bars adapted to rest upon the bolsters of a running gear, of end boards carried by said cross-bars, means carried by said cross-bars for engaging the running gear bolsters to prevent displacement, an intermediate medial ridge connecting the cross-bars, a pair of sections extending between the end boards and each coacting with the adjacent edge of the medial ridge, a horizontal pivotal connection between each swinging section and the end boards at the upper inner corner of the section, and means for locking said swinging sides in load retaining position.

10. In a dumping wagon, the combination, with a pair of cross-bars adapted to rest upon the bolsters of a running gear, of end boards carried by said cross-bars, means carried by said cross-bars for engaging the running gear bolsters to prevent displacement, an intermediate medial ridge connecting the cross-bars, a pair of sections extending between the end boards and each coacting with the adjacent edge of the medial ridge, a horizontal pivotal connection between each swinging section and the end boards at the upper inner corner of the section, said pivotal connection comprising a pin and socket connection at one end and a pin and open-ended slot connection at the other end, a removable retaining plate for said last mentioned connection, and means for locking said swinging sides in load retaining position.

11. In a dumping wagon, the combination, with the ends of the box thereof, of a pair of longitudinal swinging side sections pivotally supported at their upper inner corners, a depending locking pawl arranged in position to engage and retain said swinging member in load retaining position, means for locking said swinging sides in load retaining position, a divider board pivotally mounted between the end boards above the crest of the ridge, and means for holding the same in medial position.

12. In a dumping wagon, the combination with the ends of the box thereof, of a pair of longitudinal swinging side sections pivotally supported at their upper inner corners, a depending locking pawl arranged in position to engage and retain said swinging member in load-retaining position, a swinging seat member, connections between said seat member and said depending pawls whereby said pawls may be simultaneously operated by the swinging seat member, a divider board pivotally mounted between the end boards above the crest of the ridge, and means for holding the same in medial position.

13. In a dumping wagon, the combination, with a pair of cross-bars adapted to rest upon the bolsters of a running gear, of end boards carried by said cross-bars, means carried by said cross-bars for engaging the running gear bolsters to prevent displacement, an intermediate medial ridge connecting the cross-bars, a pair of sections extending between the end boards and each coacting with the adjacent edge of the medial ridge, a horizontal pivotal connection between each swinging section and the end boards at the upper inner corners of the section, means for locking said swinging sides in load retaining position, a divider board pivotally mounted between the end boards above the crest of the ridge, and means for holding the same in medial position.

14. In a dumping wagon, the combination, with a pair of cross-bars, adapted to rest upon the bolsters of a running gear, of end boards carried by said cross-bars, means carried by said cross-bars for engaging the running gear bolsters to prevent displacement, an intermediate medial ridge connecting the cross-bars, a pair of swinging sections extending between the end boards and each coacting with the adjacent edge of the medial ridge, a horizontal pivotal connection between each swinging section and the end boards at the upper inner corner of the section, said pivotal connection comprising a pin and socket connection at one end and a pin and open-ended slot connection at the other end, a removable retaining plate for said last-mentioned connection, means for locking said swinging sides in load retaining position, a divider board pivotally mounted between the end boards above the crest of the ridge, and means for holding the same in medial position.

15. In a dumping wagon, the combination, with the end boards and intermediate ridge connection, of a pair of swinging body sections pivotally mounted by the end boards, each upon an axis, at the upper inner corner of the section, and each of the said sections provided at each end with a notched member adapted to interlock with the adjacent end board.

16. In a dumping wagon, the combination, with a pair of swinging side sections having substantially parallel pivotal axes at their upper inner corners, and bottom members the inner edges whereof lie materially outside of the shaft axes, of a stationary bottom member extending between and coacting with the inner edges of the bottoms of the sections.

17. In a dumping wagon, the combination, with a pair of swinging side sections having substantially parallel pivotal axes at their upper inner corners, and bottom members the inner edges whereof lie materially outside of the pivotal axes, of a stationary ridge bottom member extending between and coacting with the inner edges of the bottoms of the sections.

18. In a dumping wagon, the combination, with a pair of swinging side sections having substantially parallel pivotal axes at their upper inner corners, and bottom members the inner edges whereof lie materially outside of the pivotal axes, of a stationary bottom member extending between and coacting with the inner edges of the bottoms of the sections, and means for simultaneously swinging said sections upon their pivotal axes.

19. In a dumping wagon, the combination, with a pair of swinging side sections having substantially parallel pivotal axes at their upper inner corners, and bottom members the inner edges whereof lie materially outside of the pivotal axes, of a stationary ridge bottom member extending between and coacting with the inner edges of the bottoms of the sections, and means for simultaneously swinging said sections upon their pivotal axes.

20. In a dumping wagon, the combination, with a pair of swinging side sections having substantially parallel pivotal axes at their upper inner corners, and bottom members the inner edges whereof lie materially outside of the pivotal axes, of a stationary ridge bottom member extending between and coacting with the inner edges of the bottoms of the sections, a divider board pivotally mounted between the swinging sections above the apex of the ridge, and means for holding said divider in medial position.

In witness whereof, I, have hereunto set my hand and seal at Indianapolis, Indiana, this fourth day of May, A. D. one thousand nine hundred and seven.

GEORGE W. CRANE. [L. S.]

Witnesses:
ARTHUR M. HOOD,
THOMAS W. McMEANS.